(12) United States Patent
Burnworth et al.

(10) Patent No.: US 7,804,545 B2
(45) Date of Patent: Sep. 28, 2010

(54) SWITCHED INPUT VIDEO DEVICE

(75) Inventors: Randy L. Burnworth, Denton, TX (US); Karol Freed, Thousand Oaks, CA (US)

(73) Assignee: Shomi Technologies Corporation, Denton, TX (US)

( * ) Notice: Subject to any disclaimer, the term of this patent is extended or adjusted under 35 U.S.C. 154(b) by 1308 days.

(21) Appl. No.: 10/665,930

(22) Filed: Sep. 19, 2003

(65) Prior Publication Data

US 2004/0119893 A1 Jun. 24, 2004

Related U.S. Application Data

(60) Provisional application No. 60/412,357, filed on Sep. 21, 2002.

(51) Int. Cl.
*H04N 5/268* (2006.01)
(52) U.S. Cl. .................... 348/705; 348/555
(58) Field of Classification Search .......... 348/705, 348/706, 554–558, 552
See application file for complete search history.

(56) References Cited

U.S. PATENT DOCUMENTS

| 4,644,387 | A  | * | 2/1987  | Bell et al. ............... 348/554 |
| 5,349,389 | A  |   | 9/1994  | Keller |
| 5,457,546 | A  |   | 10/1995 | Hong |
| 5,640,212 | A  |   | 6/1997  | Baccarini |
| 5,889,565 | A  |   | 3/1999  | Brennesholtz |
| 6,067,123 | A  | * | 5/2000  | Lee ........................ 348/554 |
| 6,310,660 | B1 |   | 10/2001 | Abuali et al. |
| 6,480,241 | B1 |   | 11/2002 | Boccaccio |
| 6,697,122 | B2 | * | 2/2004  | Kim ........................ 348/554 |
| 2002/0051089 | A1 | | 5/2002 | Arimizu et al. |

OTHER PUBLICATIONS

Atsushi Ishizu et al., "Digital Signal Processing for Improved NTSC Television Receiver," IEEE Transactions on Consumer Electronics, Aug. 1989, No. 3, pp. 259-265.

* cited by examiner

*Primary Examiner*—M. Lee

(57) ABSTRACT

A switched input video device has a switched input, video improvement circuitry and/or transcoder circuitry, and a switch for communicating a switched input to at least one of the video improvement circuitry and the transcoder circuitry.

4 Claims, 18 Drawing Sheets

SWITCHED INPUT VIDEO DEVICE

PRIORITY CLAIM

This patent application claims the benefit of the priority date of U.S. Provisional Patent Application Ser. No. 60/412,357, filed on Sep. 21, 2002 and entitled SYSTEM AND METHOD FOR IMPROVED VIDEO PROCESSING pursuant to 35 USC 119, the entire contents of the provisional patent application are hereby expressly incorporated by reference.

FIELD OF THE INVENTION

The present invention relates generally to video processing. The present invention relates more particularly to a method and apparatus taking advantage of video improvement circuitry (such as that described herein) and/or for taking advantage of transcoding circuitry of one video device by another video device which generally lacks such video improvement and/or transcoding capability.

BACKGROUND OF THE INVENTION

Video systems for use in broadcast television, cable television, closed circuit television, computer systems and the like are well known. According to such video systems, a video signal from a camera is ultimately provided to a display device, such as a television or computer monitor. Frequently, the video signal is recorded upon a medium, such as videotape, hard drive or a DVD disc, prior to being displayed upon the display device.

The video signal may be generated, stored, and displayed according to one of a number of different standards. The National Television System Committee (NTSC), Phase Alternation by Line (PAL), and System Electronique Couleur Avec Memoire (SECAM) standards are examples of such standards. The NTSC standard is used in North America and Japan. The PAL standard is used in most of the rest of the world, with the exception of France, parts of Greece, Eastern Europe, Russia, and Africa, where SECAM is utilized. Other standards, as well as variations of these standards, also exist.

These standards were, for the most part, formulated when television was in its infancy. Out of necessity, the standards had to define a system for facilitating the generation, broadcast and display of a video signal which could be accommodated by the electronic equipment of that earlier time. As those skilled in the art will appreciate, the electronic equipment that existed when these standards were being formulated had comparatively limited bandwidth and dynamic range with respect to modern video equipment. That is, the circuits designed and the components selected could only accommodate a limited bandwidth and dynamic range, as reflected by the appropriate standard.

Further, in order to provide video equipment at competitive prices, manufactures at that earlier time and for some time thereafter used components having greater tolerances than is common today. The use of components having 10 and 15 percent tolerances on the critical values was common.

The use of components having such limited bandwidth and dynamic range, as well as such wide tolerances, inherently limited the capability of the devices made therewith to handle video signals. That is, video signals processed by such equipment were limited to those signals which closely met the appropriate standard (such as the NTSC standard in the United States).

However, contemporary video devices commonly use components and circuits which are capable of processing video signals which do not strictly comply with video standards. That is, contemporary video devices are generally fabricated so has to have greater bandwidth than that required by the NTSC standard, for example, and also typically use components that have much tighter tolerance that earlier devices. This is due, at least in part, to improve manufacturing techniques with respect to both the components and the video devices themselves. Still, the compromises are incorporated in all resulting products, brands from the art.

Moreover, the quality of contemporary video devices resulting from such improvements in circuit bandwidth and dynamic range, as well as improved component tolerances, facilitates the use of non-standard waveforms according to the present invention. These non-standard waveforms provide improvements to the aesthetic appeal of a video image displayed using the video devices. For example, the improved quality of a contemporary video device frequently facilitates the use of waveforms having quicker rise and fall times (corresponding to higher frequency components thereof) and having greater amplitude or other non-standard signal levels, as compared to the appropriate standard.

Thus, although such contemporary video devices have proven generally suitable for their intended purposes, they possess inherent deficiencies and compromises which detract from their overall effectiveness and desirability. For example, contemporary video devices do not take full advantage of the quality of the components and circuits thereof to provide the best possible picture. This is the "its good enough" syndrome.

As such, it is desirable to provide a method and apparatus for improving video which, among other things, takes advantage of the improvment quality of contemporary video devices so as to permit the use of newly shaped and retimed video signal waveforms which do not necessarily comply strictly with the appropriate standard.

Further, in spite of the improvements in bandwidth and dynamic range for contemporary video devices, these devices still have finite bandwidth and dynamic range. Thus, it is further desirable to provide a method and apparatus for improving the video waveforms which, among other things, optimizes the operation and picture quality results of a video device within the constraints of such a finite bandwidth and dynamic range.

BRIEF SUMMARY OF THE INVENTION

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112.

The present invention specifically addresses and alleviates the above mentioned deficiencies associated with the prior art. More particularly, the present invention comprises a method for improving video waveforms, wherein the method comprises forming a video signal waveform which takes greater precision of the module invention that produces the better picture quality output of a video device when compared with a video signal that complies fully with the standard according to which the video device is constructed.

Preferably, the video signal comprises a composite video signal. However, those skilled in the art will appreciate that the present invention is applicable to video signals generally and that the video signal therefore does not necessarily comprise only a composite or component video signal. Thus, the description of a composite or component video signal herein is by way of example only, and not by way of limitation.

According to one aspect of the present invention, the video signal is at least partially NTSC compliant. Alternatively, the video signal is at least partially PAL compliant. Alternatively, the video signal is at least partially SECAM compliant.

However, the video signal may alternatively be at least partially compliant to any other video standard including analog and digital or may alternatively not be compliant but adaptable by any familiar with the art to any video standard whatsoever. Thus, the description of a video signal which is at least partially compliant to a standard by whatever conversion (i.e. example fiber optics, Mpeg compression or digital) herein is by way of example only, and not by way of limitation.

According to another aspect, the present invention comprises a method for improving the video picture quality, wherein the method comprises forming a video signal having higher frequency components than could be accommodated by video equipment manufactured at approximately the time that a standard for the video equipment was formulated.

According to another aspect, the present invention comprises a method for improving the video picture quality, wherein the method comprises forming a video signal having greater dynamic range than could be accommodated by video equipment manufactured at approximately the time that a standard for the video equipment was formulated.

According to another aspect, the present invention comprises a method for improving the video picture quality, wherein the method comprises forming a video signal having higher frequency components than could be accommodated by video equipment manufactured prior to the year 1960.

According to another aspect, the present invention comprises a method for improving the video picture quality, wherein the method comprises forming a video signal having greater dynamic range than could be accommodated by video equipment manufactured prior to the year 1960.

According to another aspect, the present invention comprises a method for improving the video picture quality, wherein the method comprises modifying a video signal waveform such that the video signal does not comply with a standard and applying the video signal to a video device which complies with the standard, wherein the modification results in improvement of any/all displayed video images standard or non standard.

Preferably, the method comprises electronically adding light to a video image so as to improve the apparent detail, color and picture quality contained therein.

Preferably, the method comprises electronically adding light to a video image after recording the image, so as to improve the now visible and the apparent detail contained therein.

Preferably, the method comprises electronically removing light from a video image so as to cause a night effect of a day or will light scene for the apparent detail contained therein.

Preferably, the method comprises separating the video content above baseline from a sync below baseline with the burst so as to cause an amplitude change approximately equal to all of the video picture content above baseline substantially equally or greater without adversely affecting the saturation of color.

Preferably, the method comprises increasing 0.7 volts of video above baseline to a level higher than 0.7 volts so as to electronically add light to a video image without ballooning, distortion or color modification with the art now caused with the invention.

Preferably, the method comprises increasing 0.7 volts of video above baseline to a level higher than 0.7 volts so as to electronically add light to a video image without substantially causing distortion, ballooning and color shift.

Preferably, the method comprises electronically adding/removing light with respect to a video image without substantially changing a synch, burst saturation and rotation of the video signal and/or any change in the DC clamp position of baseline.

Preferably, the method comprises setting black below the baseline.

Preferably, the method comprises setting black below the baseline for any NTSC, Pal, etc. even RGB composite video signal to a low equal to the bottom of burst.

Preferably, the method comprises setting black at more than approximately 5% IRE below the baseline for an NTSC composite video signal.

Preferably, the method comprises setting black at between approximately 10% and approximately 12% IRE below the baseline for an NTSC composite video signal.

Preferably, the method comprises setting a black start at approximately 10% to approximately 12% below base line for component RGB video.

Preferably, the method comprises setting a black start at approximately 10% to approximately 12% below base line and setting a white stop between approximately 1 volt and approximately 2 volts above the base line for component RGB video.

Preferably, the method comprises setting a black start at approximately 10% to approximately 12% below base line and setting a white stop between approximately 1 volt and approximately 2 volts above the base line for component RGB video and also further comprises retiming the video signal.

Preferably, the method comprises setting black at approximately 20% IRE below the baseline for an NTSC composite video signal.

Preferably, the method comprises dividing a video display into a processed portion and an unprocessed portion so as to provide a visual indication of the improved results and effects of processing on the same monitor.

Preferably, the method comprises dividing a video display into a processed portion and an unprocessed portion with a movable wipe, so as to provide a visual indication of the improved effects of processing.

Preferably, at least of portion of the method is facilitated via an application specific integrated circuit (ASIC).

Preferably, at least a portion of the method is facilitated via a digital complex programmable logic device (CPLD).

Preferably, at least of portion of the method is facilitated via digital signal processing (DSP).

Preferably, the method comprises improving an edge transition by driving a video signal approximately as steeply (both up and down) as a video device will accommodate. Such driving of the video signal may include adding frequency components thereto which are higher than anticipated by the appropriate standard.

Preferably, the method comprises improving an edge transition by driving a video signal approximately as steeply as a video device will accommodate and clamping the video signal so as to mitigate undesirable side effects.

According to one aspect, the present invention comprises a video image produced using the method described herein.

According to one aspect, the present invention comprises a device configured to practice the method described herein.

According to one aspect, the present invention comprises a camera configured to practice the method described herein.

According to one aspect, the present invention comprises a display device configured to practice the method described herein.

According to one aspect, the present invention comprises a DVD player/recorder configured to practice the method described herein.

Indeed, the present invention is generally applicable to all video cameras, recorders, and monitors.

These, as well as other advantages of the present invention, will be more apparent from the following description and drawings. It is understood that changes in the specific structure shown and described may be made within the scope of the claims, without departing from the spirit of the invention.

BRIEF DESCRIPTION OF THE DRAWINGS

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENT

Figure 1:
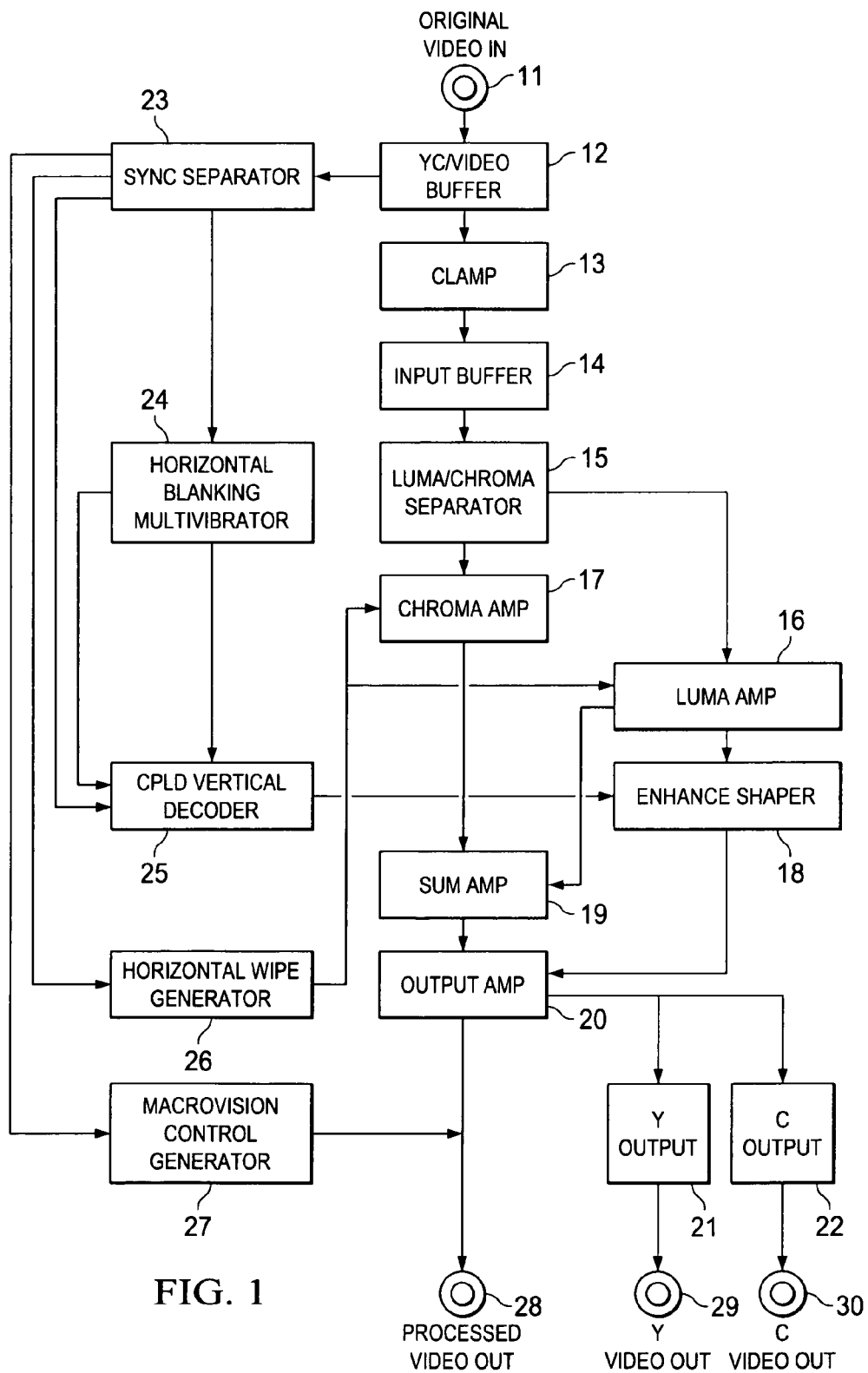
FIG. 1 is a block diagram showing the major functional aspects of the present invention.
Figure 2A:
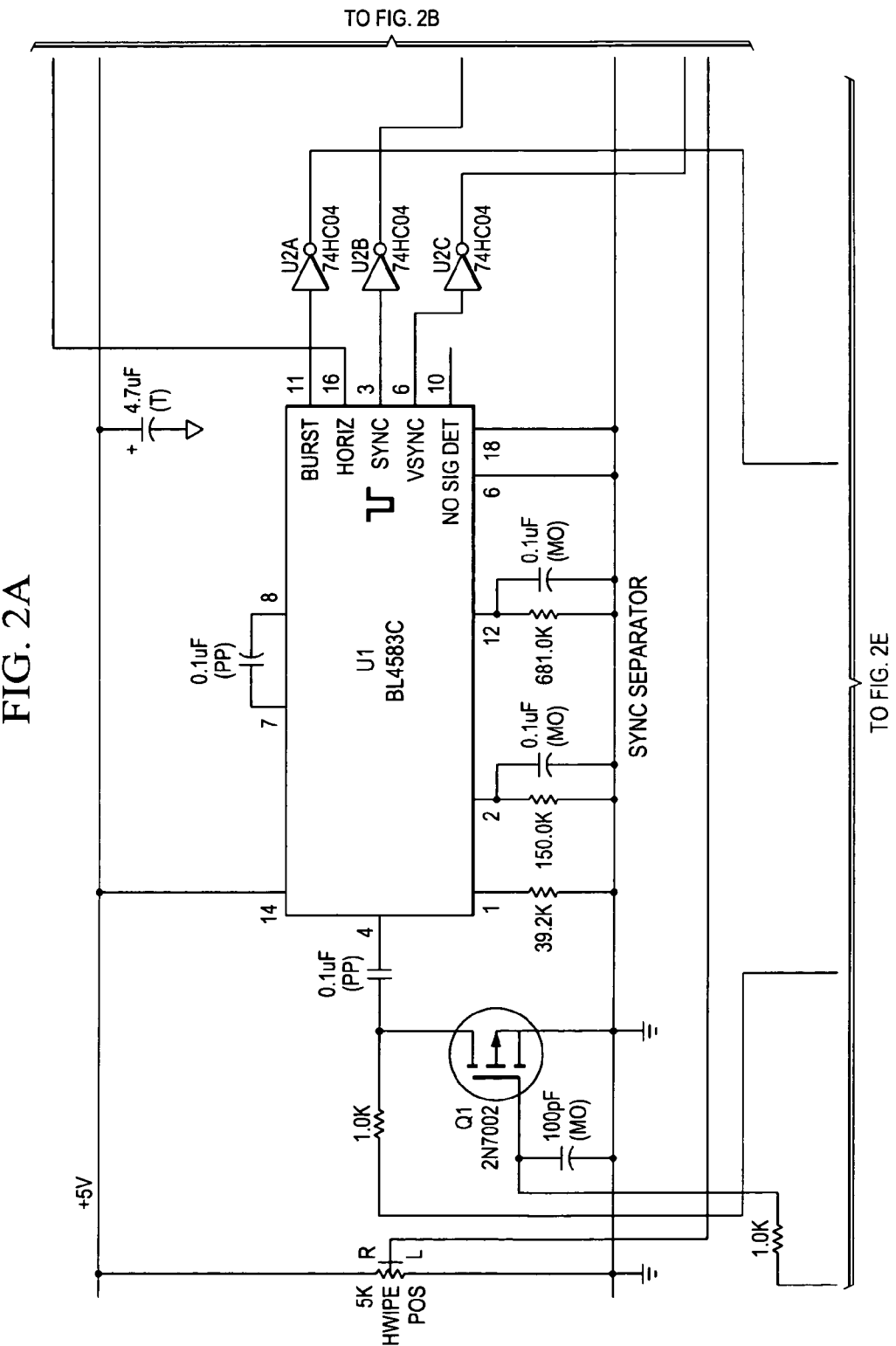
FIGS. 2A-2L present a detailed schematic circuit diagram of the present invention.
Figure 2B:
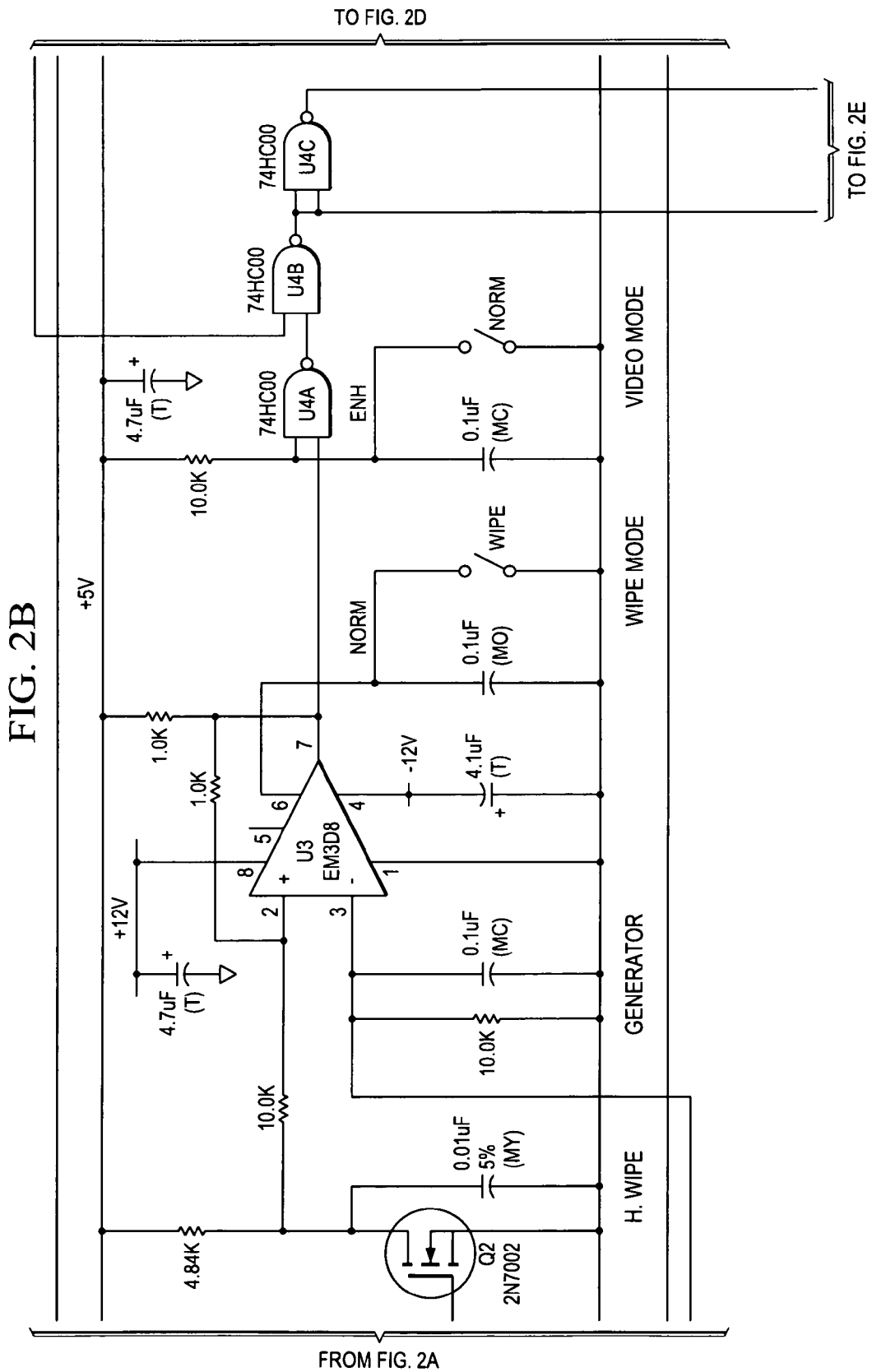
Figure 2C:
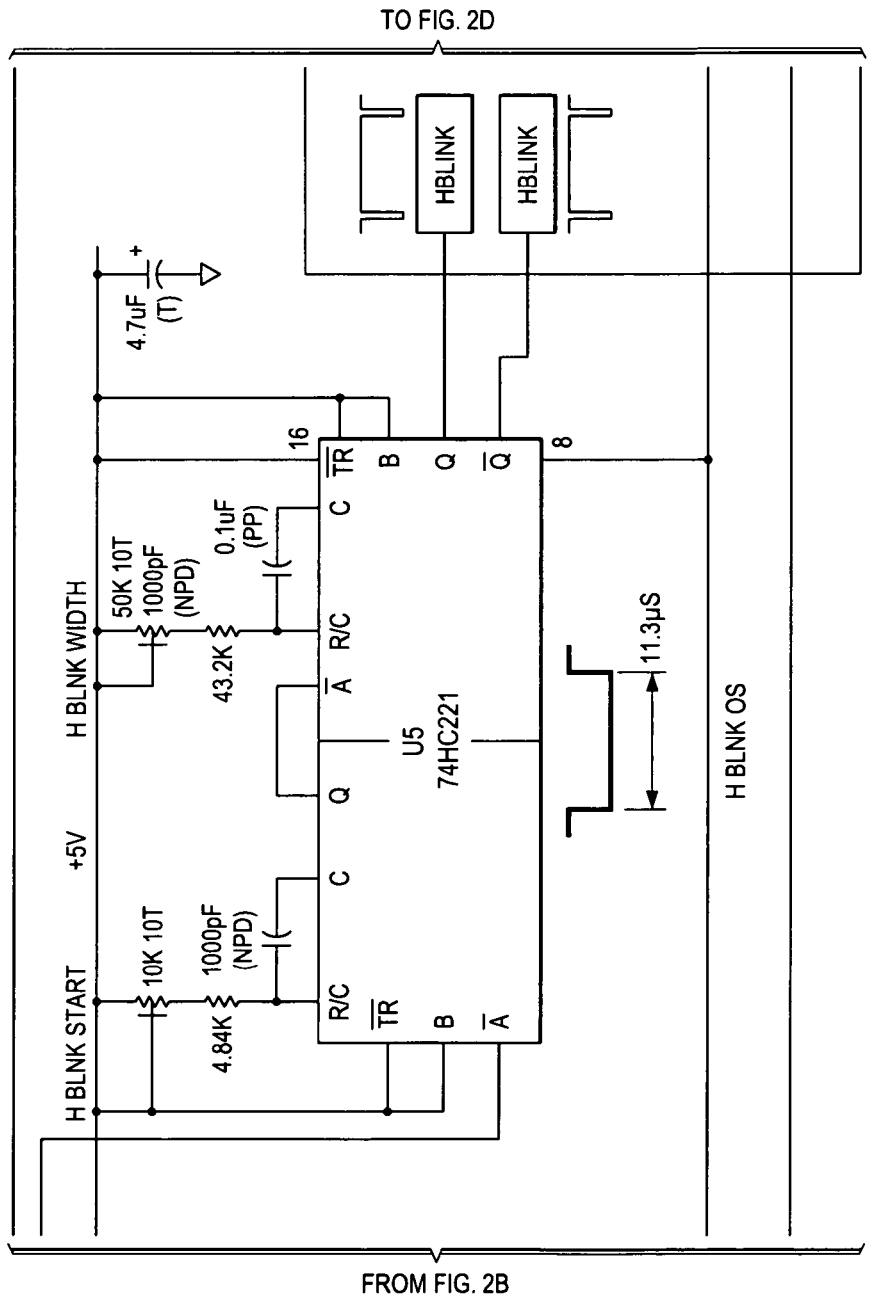
Figure 2D:
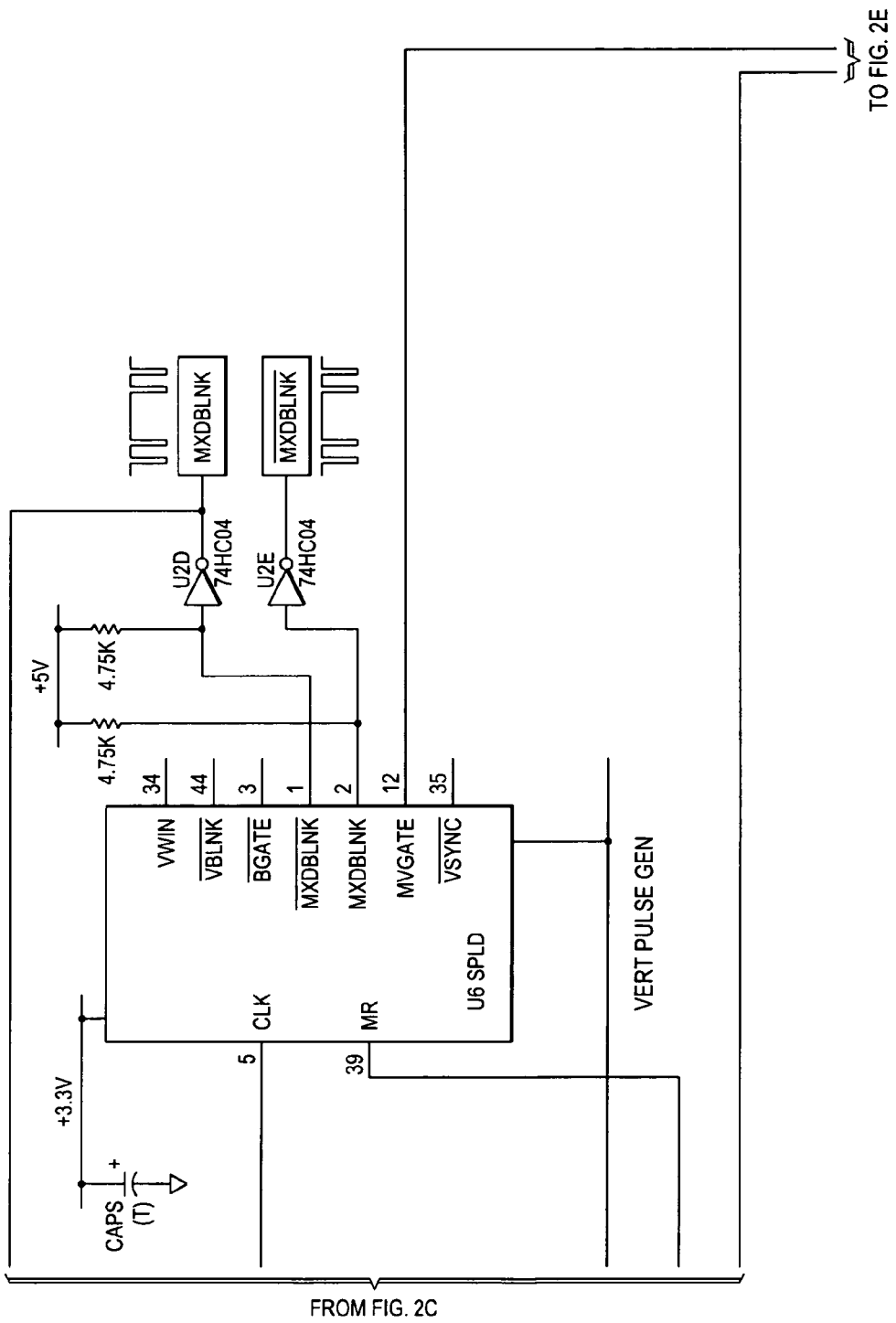
Figure 2E:
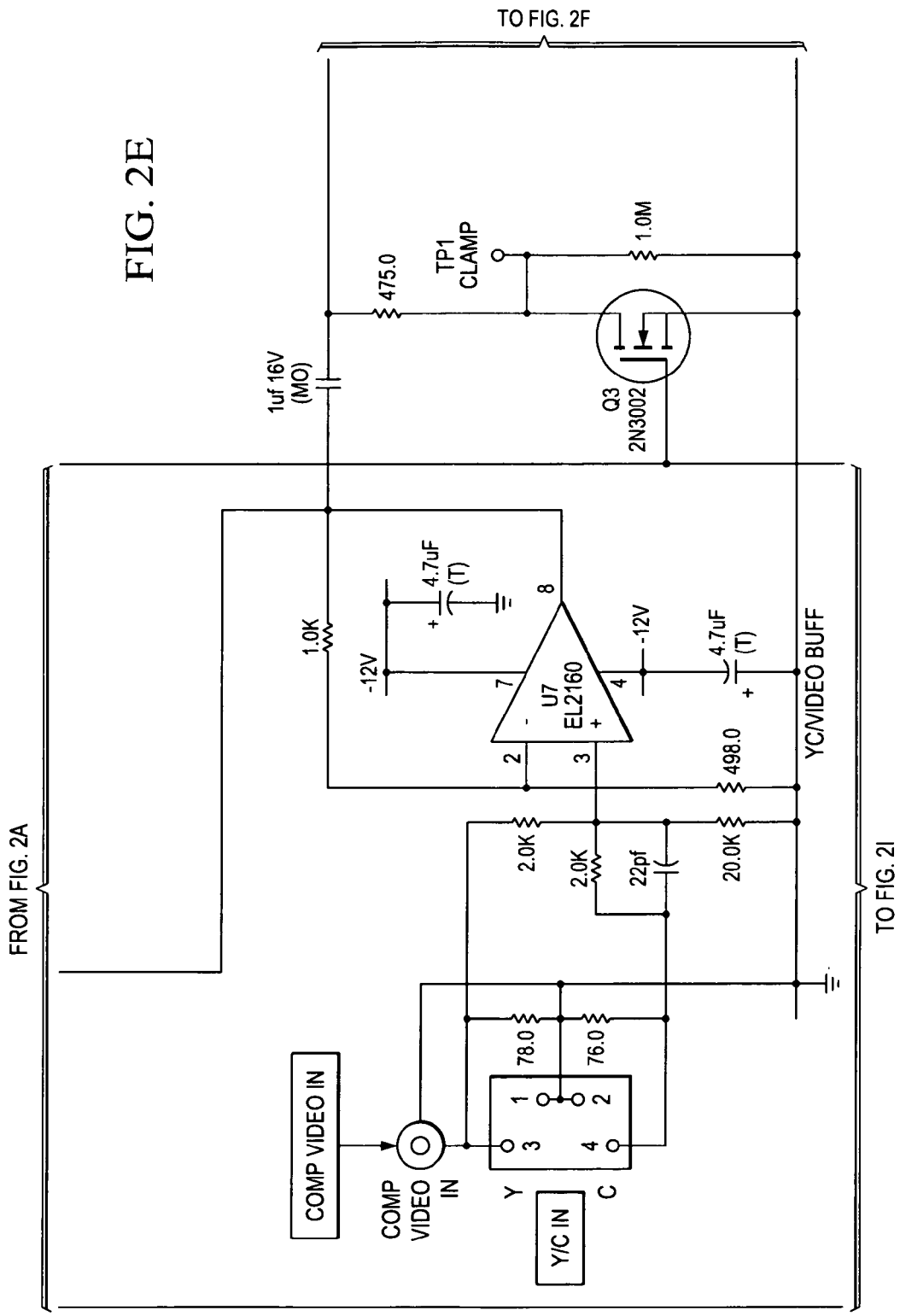
Figure 2F:
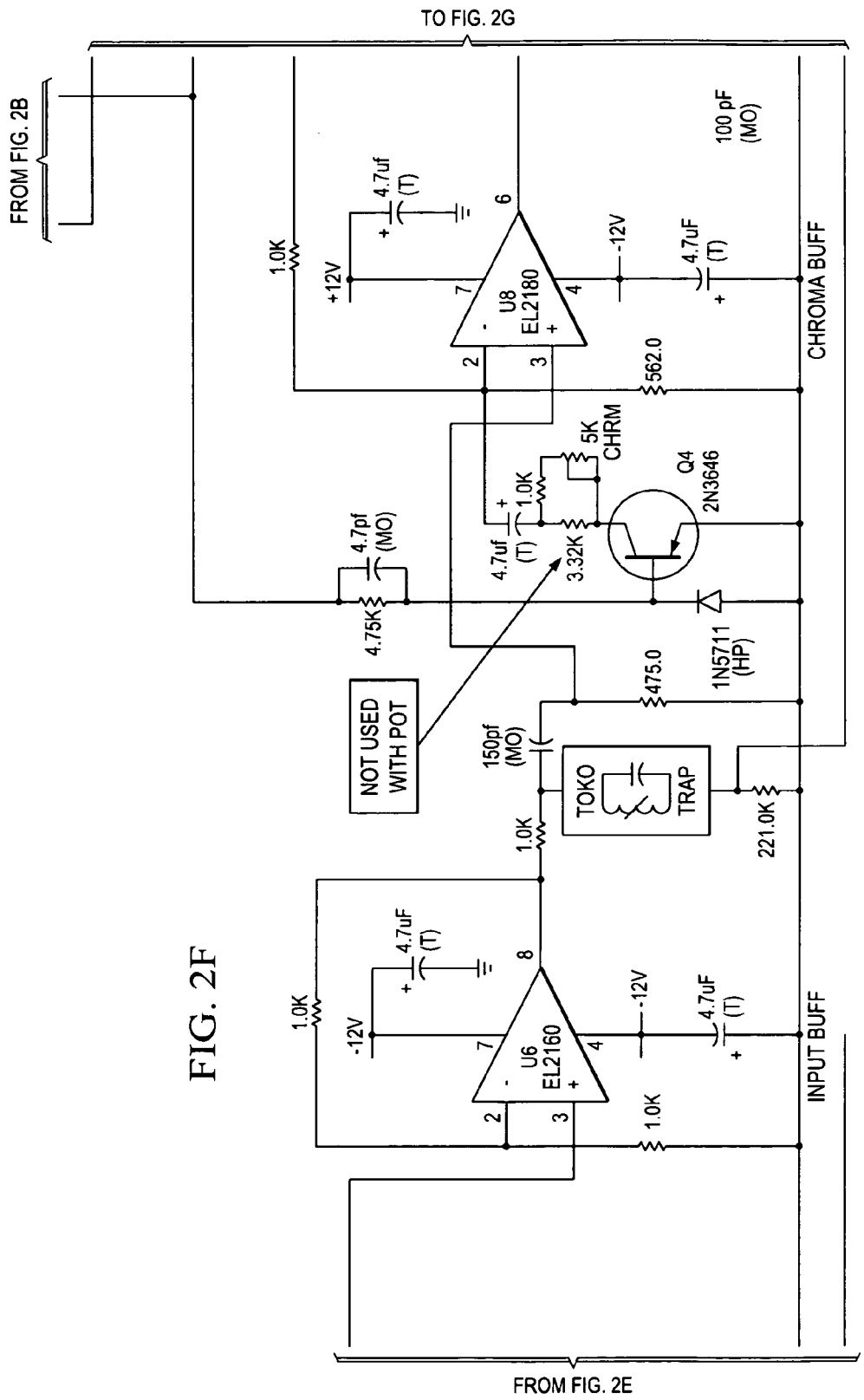
Figure 2G:
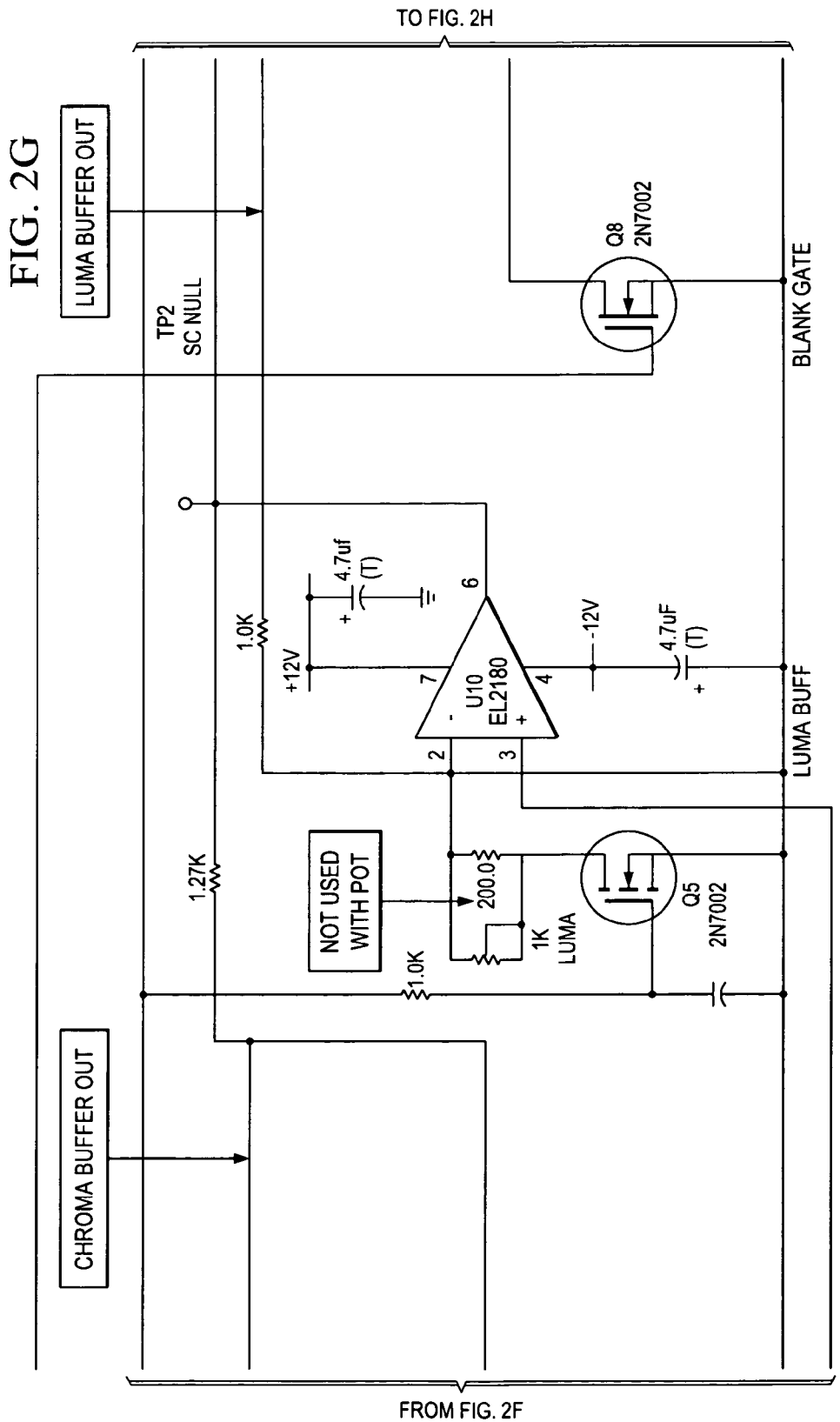
Figure 2H:
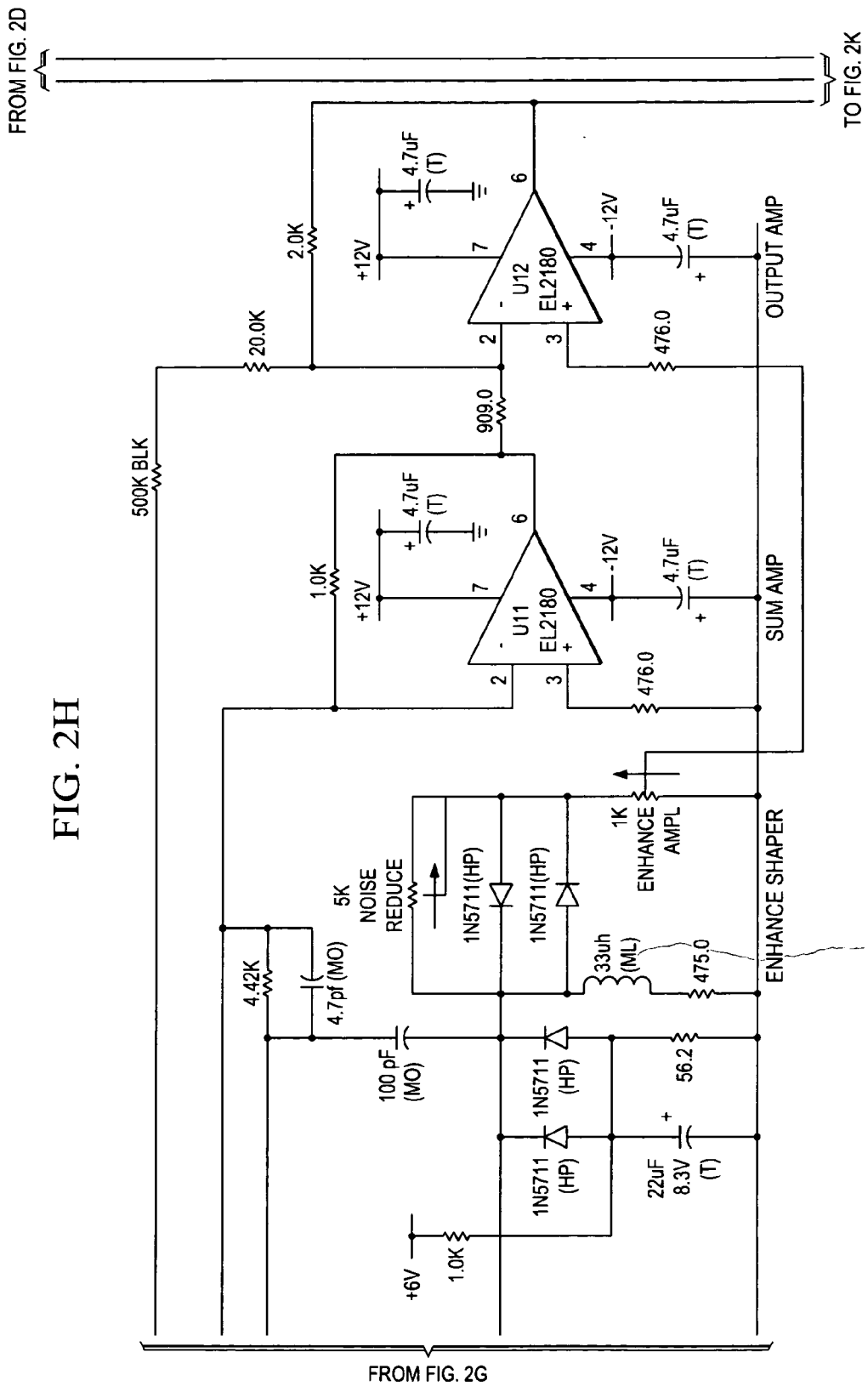
Figure 2I:
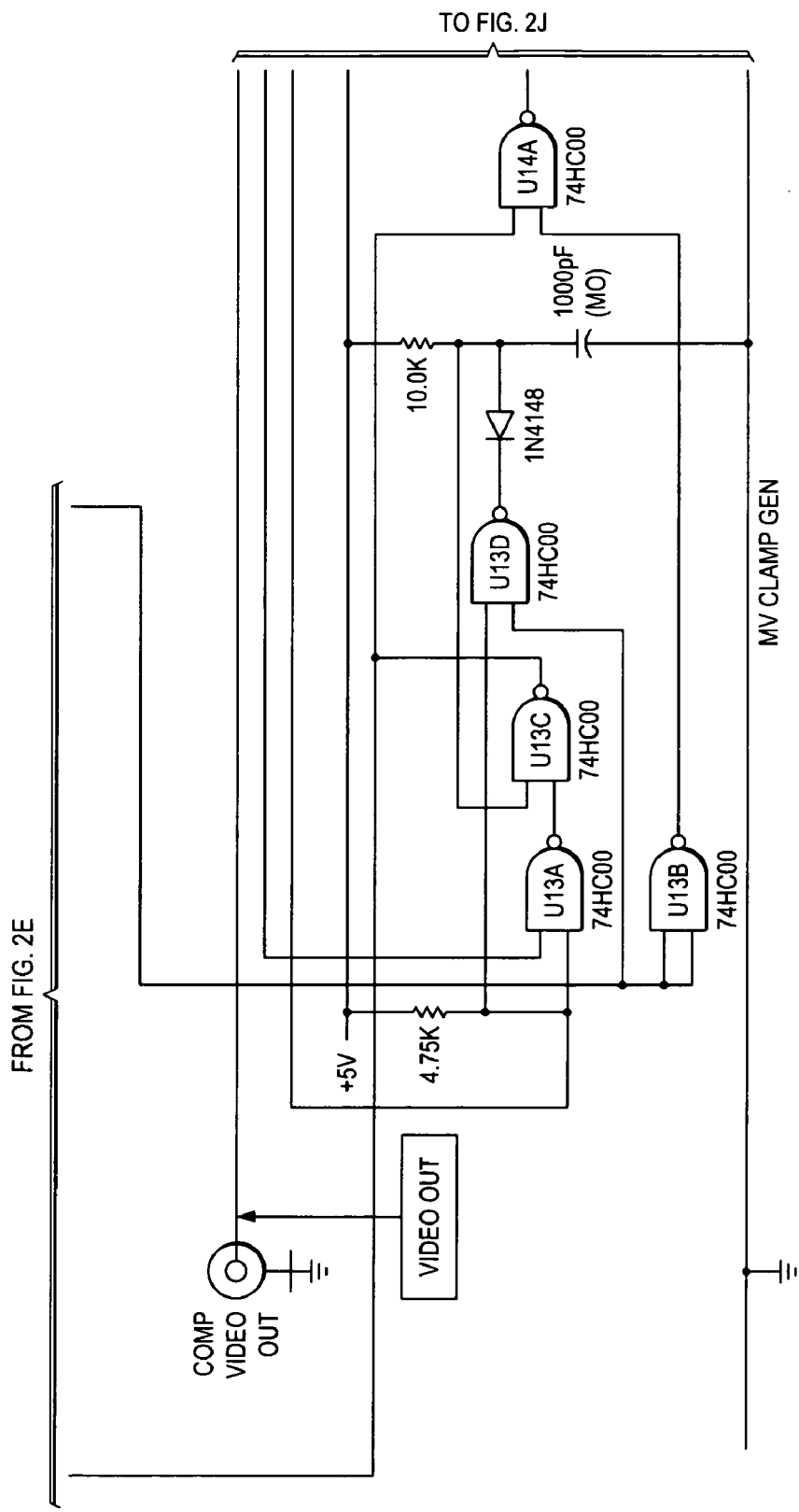
Figure 2J:
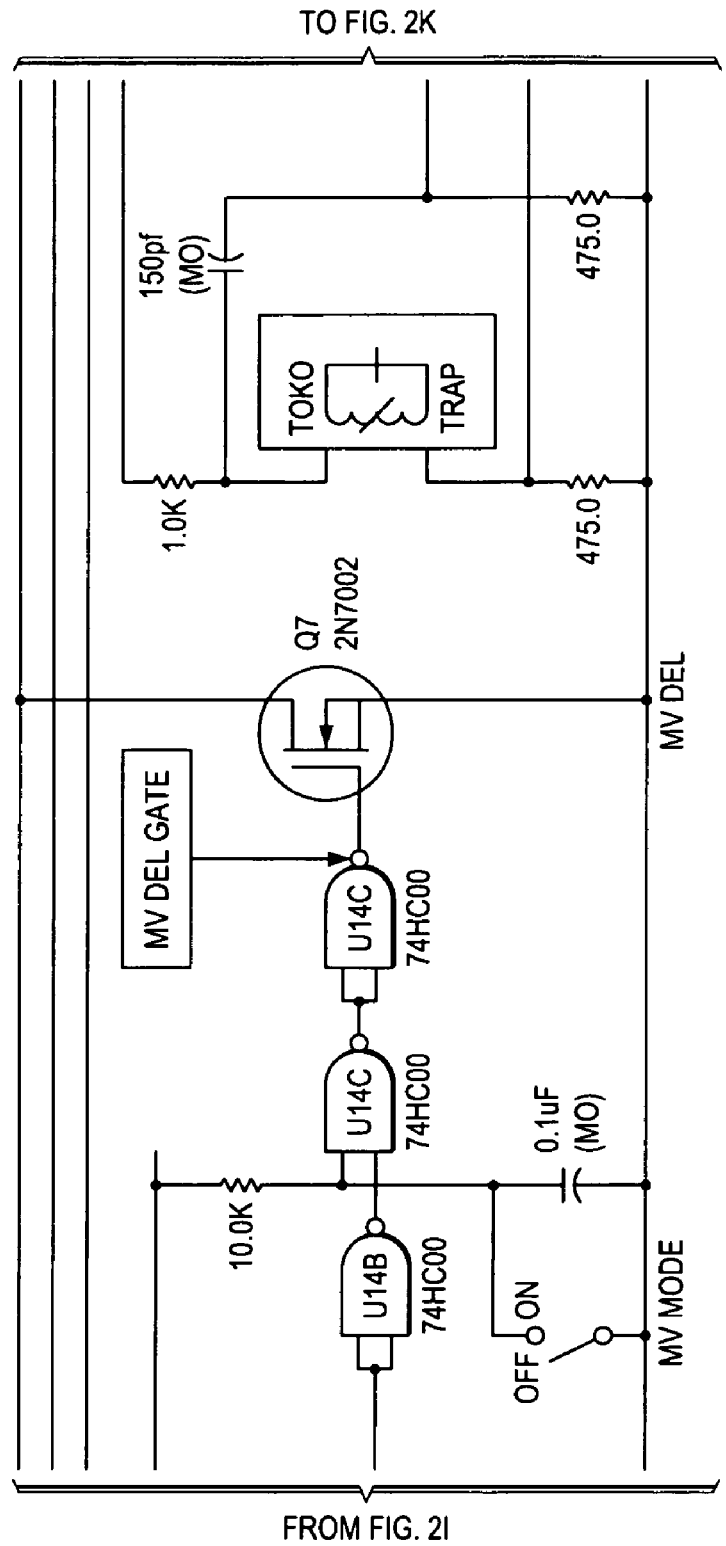
Figure 2K:
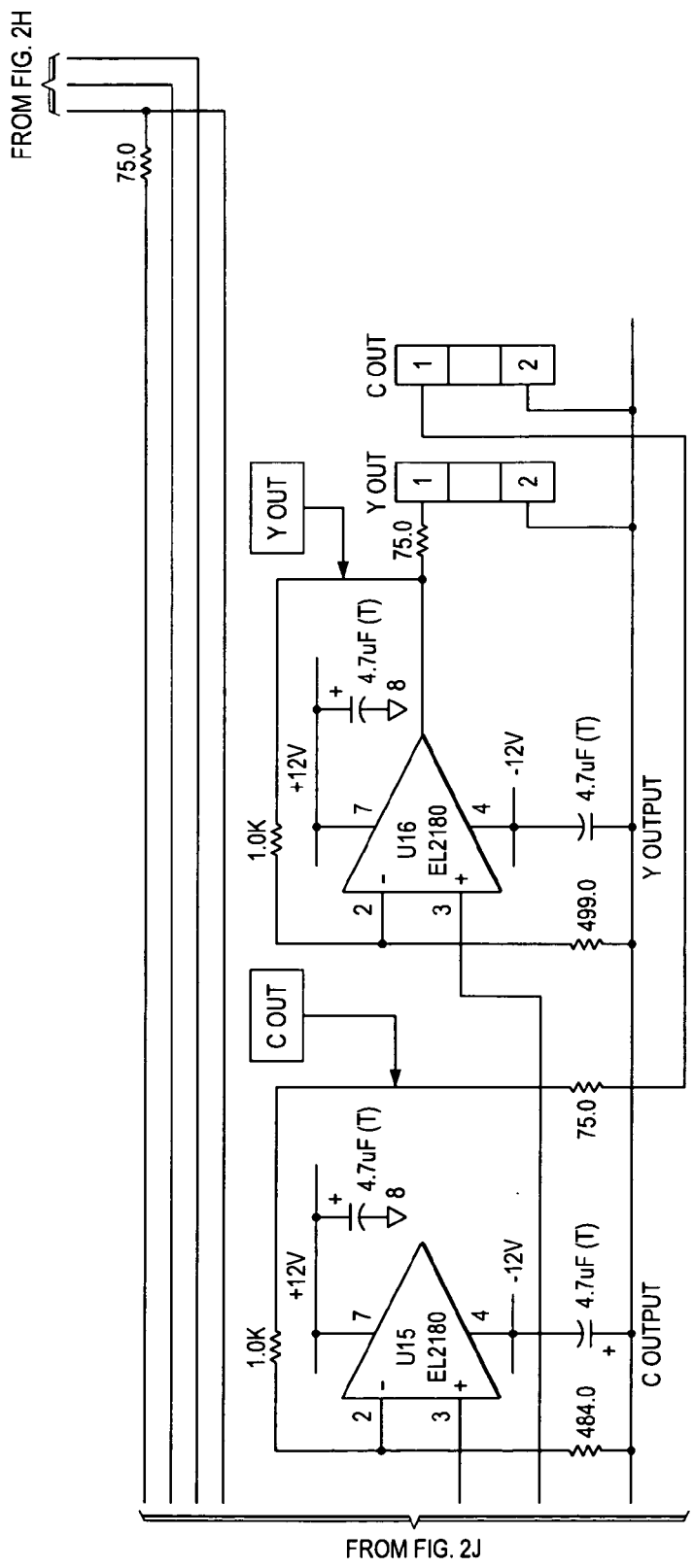
Figure 2L:
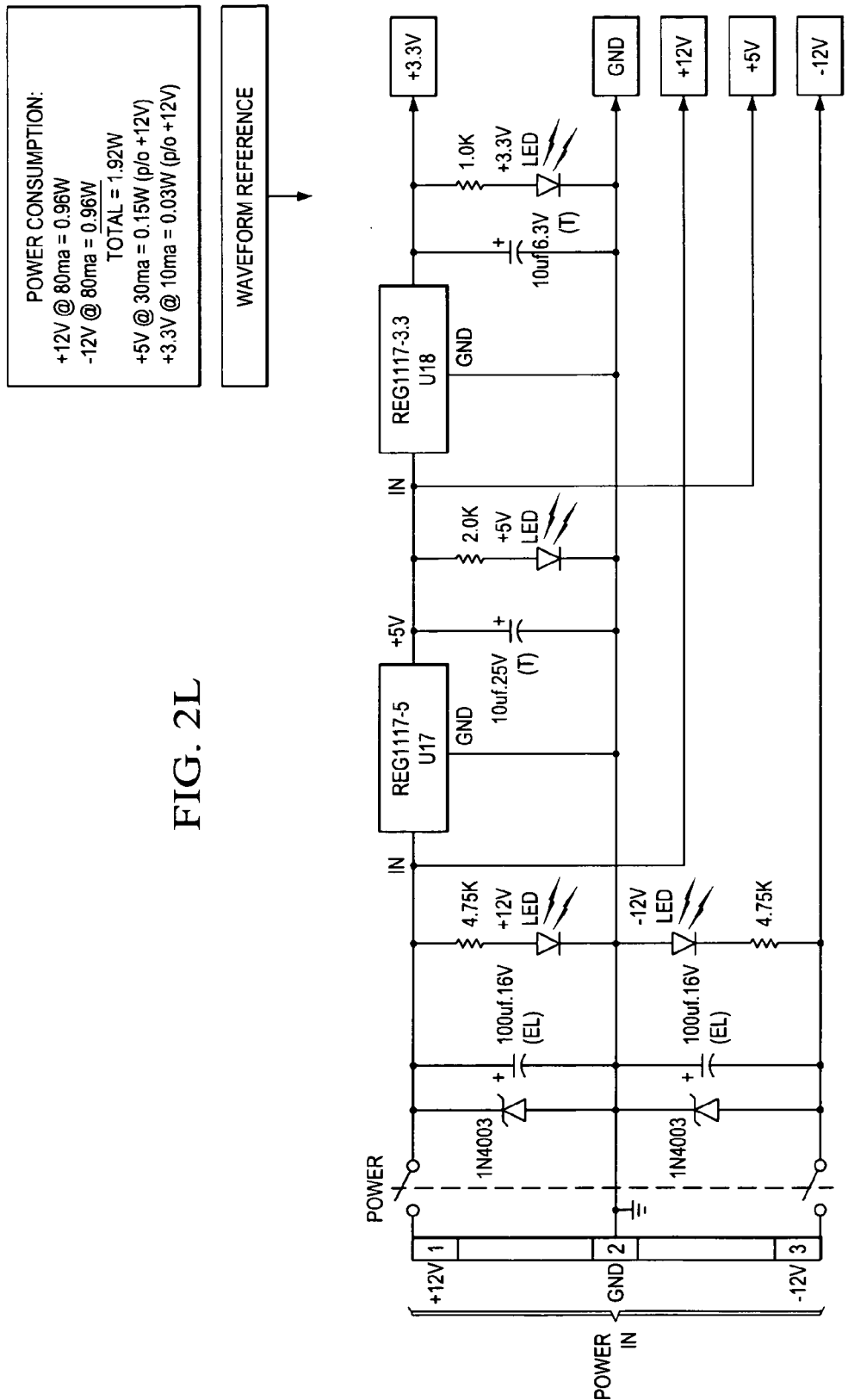

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed herein even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims therefore include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

Thus, the detailed description set forth below in connection with the appended drawings is intended as a description of the presently preferred embodiment(s) of the invention and is not intended to represent the only form(s) in which the present invention may be constructed or utilized. The description sets forth the functions and the sequence of steps for constructing and operating the invention in connection with the illustrated embodiment(s). It is to be understood, however, that the same or equivalent functions may be accomplished by different embodiments that are also intended to be encompassed within the spirit of the invention.

The present invention can be implemented as a stand alone device or can be embodied in a VCR, DVD Internet output or input device, a set top box, hard drive, computer, camera or any other video device.

The present invention is illustrated in FIGS. 1-6, which depict a presently preferred embodiment thereof.

Referring now to FIG. 1, a block diagram of the present invention is provided. An original video input port 11, such as an RCA jack, facilitates the input of a video signal to YC/video buffer 12. A video signal from a video storage device such as a VCR or DVD player may be used to provide an input to the original video input port 11.

The YC/video buffer 12 provides outputs to videos sync separator 23 and clamp 13. Clamp 13 provides an output to input buffer 14.

Input buffer 14 provides an output to luma/chroma separator 15, which provides outputs to luma amp 16 and chroma amp 17. Luma amp 16 provides outputs to clarity resolution shaper 18 and sum amp 19. Chroma amp 17 also provides an output to sum amp 19. Sum amp 19 provides an output to output amp 20 which provides an output to processed video output port 28, which may be in communication with a video display device, such as a television or computer monitor.

The output amp 20 provides output signals to the Y output 21 and the C output 22, from which outputs are provided to the Y video output port 29 and the C video output port 30, respectively.

The sync separator 23 provides outputs to the horizontal blanking multi-vibrator 24, the CPLD vertical decoder 25, the horizontal Y generator 26, and the macro vision control generator 27.

The horizontal blanking multi-vibrator 24 provides outputs to the CPLD vertical decoder 25. The CPLD vertical decoder 25 provides an output to the clarity resolution shaper 18. The horizontal Y generator 26 provides an output to the chroma amp 17.

The macro vision control generator 27 provides an output to the processed video output port 28.

These items are discussed in further detail with respect to the schematic of FIGS. 2A-2L, the logic information of FIG. 3, the timing diagram of FIG. 4, and the waveforms of FIGS. 5 and 6 below.

Referring now to FIGS. 2A-2L, a detailed circuit schematic is provided. The basic function of this circuit, which may be embodied as a module or on a die, is to accept NTSC composite or component encoded or YC video input, process the video signal into Y (luminance) and C (chrominance) components, and provide facility for improving the clarity and color of the output video image.

The input video signal is applied to U7, YC/Video Buffer amplifier, and amplitude standardized. Back porch clamp output of U2A is applied to the Gate of Q3 active DC restorer. Video from U7 output is AC coupled to Q3 and the blanking level is clamped to ground during the back porch time.

The resistor in the drain of Q2 maintains color burst amplitude and phase during the clamping action. The clamped signal is applied to U8 input buffer who's output is AC coupled into U1 Sync Separator, and also processed by a chroma/luma crossover filter. The chroma signal is applied to CHROMA BUFF U9 and the luminance signal is applied to U10 LUMA BUFF. The outputs of both buffers are applied to the inverting input (sum node) of U1 via scaling resistances.

The output of U10 is processed by a high pass filter with a bell shaped bandpass (nominal response: 500 KHz −12 DB, 1.25 MHz −6 DB, 2 MHz 0 DB, 3 MHz −6 DB, 3.38 MHz −30 DB, 4.2 MHz −6 DB) and diode noise removal waveform forming the new clarity resolution signal shape. The improve clarity signal response contains negligible mid or low frequency video information.

The noise removal diodes are shunted with the adjustable NOISE REDUCE control. Noise removal depth is determined by the shunt resistance value, lower value—less noise removal of the clarity signal.

The CLARITY/RESOLUTION AMPL control terminates the noise shaping waveform output and the wiper position determines the clarity performance amplitude. The wiper output feeds the non-inverting input of OUTPUT AMP U12. Q5 gates the clarity waveform signals off during video blanking time.

U1 Sync Separator separates mixed sync from the composite video signal, and derives various timing components. U1 BURST, SYNC, and VSYNC outputs are buffered and inverted by U2A, B, and C.

U5, a dual One Shot multivibrator, regenerates Horizontal Blanking. The first section is triggered from the HORIZ output of U1 and generates H BLNK START. The output of this half triggers the second section H BLNK WIDTH whose output is regenerated horizontal blanking.

U2C and U5 HBLNK outputs are input to U6, a CPLD (computer programmable logic device) that outputs MIXED BLANKING and MVGATE processing signals.

Q2 generates a horizontal rate saw tooth waveform with nominal peak amplitude of 5V. This is applied to the non-inverting input of comparator U3. An adjustable zero to plus 5VDC is applied to the inverting input of the comparator by the HWIPE control in the Demo Panel.

The comparator output is a variable duration horizontal rate square wave whose width is determined by the voltage on the inverting input. The WIPE MODE switch controls the gating function of U4, in NORM mode the output is logic zero, in WIPE mode the output is a the variable width square wave. MXDBLNK from U2D output is applied to one input of U4B and the VIDEO MODE selector to the other.

U4B gates off the HWIPE signals during regenerated mixed blanking. In the NORM position the video is not enhanced (similar to bypass), in clarity position the clarity waveform is added to the video signal. U4C inverts the output of U4B.

As the HWIPE position is moved from picture left to right the normal video image quality is improved by adding the following, chroma level (Q4 shunt switch), contrast corrected luminance added light level (Q5 shunt switch), and clarity resolution (Q5 blank gate). Default operating mode is clarity video (no HWIPE control attached).

U11 output is coupled to U12 inverting input via a resistive scaling network consisting of the AMPL control and a fixed resistance value. U12 inverts the video signal and the output provides a 75 Ω source terminated standard level NTSC video signal output. Composite video at 2× amplitude from U12.

The output is separated into Luminance (Y) and Chrominance (C) components by the high/low crossover R/C/L network. Chroma output feeds U15 C OUTPUT providing 300MV p-p 75 ohm source terminated C video output. Luminance output feeds U16 Y OUTPUT providing 1V p-p 75 ohm source terminated Y video output.

A Macrovision (a federally registered trademark of Macrovision corporation) processing circuit is optionally included and can be programmed to remove or pass the copy prevention signals from the vertical blanking interval. Q1 suppresses the copy prevention signals from U1 sync separator input by clamping them to ground for the eight horizontal lines during the vertical interval period that Macrovision signals are present. U13 and U14 form the Macrovision Clamp Generator (MV CLAMP GEN). U13D output pulse includes horizontal blanking plus the horizontal back porch time. When MV MODE switch is OFF Q7 is gated ON during the vertical interval period deleting the Macrovision signal by shunting it to ground. When MV MODE is ON the Macrovision signal is allowed to remain on the output signal.

Operating power is ± 12VDC, and sub regulated to + 5VDC by U14, and +3.2VDC by U17 and 18. On board LED indicators are provided to allow a quick visual status check of the power forms.

The video for this invention requires that the video first be stabilized by clamping it to a fixed DC potential (Q3) thereby the video blanking and pedestal remains locked and stable as other circuits operate to alter amplitudes and timing.

Black level is established in video with a normal video level having the pedestal set at 7.5 IRE. The invention improves or reduces contrast dynamic range and level of control by adjustably summing a regenerated mixed blanking from the CPLD output with the original video. The CPLD newly mixed regenerated timing now allows for a plus 10% up/down to a new invented lower, blacker, wider dynamic contrast range of minus 17.5% IRE. Without the CPLD regenerated timing a 17.5 IRE level would cause severe picture jitter. Instead, the picture has a 17.5% better contrast range and blacks are blacker, which makes the colors 17.5% IRE richer in color quality than ever before.

The clarity shaper circuit invention achieves what has never before been achieved in video. All video has a dirty glass appearance to it. This circuit so completely removes this negative quality of video as to make the video as exact as life dramatically making the video look as real as you are there in the scene as real. When the original/improved horizontal test pot moves the left to right original to improve comparison across the screen, the picture's previous dirty window haze of the original is gone, leaving a previously not obtained clarity, with a dramatically improved, detailed much higher clarity and resolution, more clearly detailed and sharp and visible than the best of high resolution solutions could without this invention. This solution works on the lowest cost to the highest performance monitors including digital cinema and HDTV of all forms.

The sharpness, the resolution, the picture detail and clarity are the result of the differences provided of the unique clarity circuit, which is noise free found in the schematic.

Resulting additive electronic light results are a resulting part of the invention whereby separating sync from video above base line and burst includes an increase to the IRE upper expanded range without baseline or sync changes, which provides for the never before done ability to add light without video picture distortion, ballooning or color shift electronically after the recording or during the recording. The key issue is this circuit does this without any color change to the video or any non-desired distortion. This is achieved via the band passed output of amplifier 12 is filtered into the chrominance and luminance amp circuit which are clamped so the amplitude increase does not move base line, which results in electronically added light.

The present invention stabilizes video blanking level utilizing line-by-line clamping to a fixed DC reference (Q3).

The present invention improves or reduces video contrast by adjustably summing regenerated blanking from the CPLD output with the original video signal. The Black Level can be adjusted nominally +10%/-17% of the incoming video signal black with the BLK control.

The present invention improves video clarity, resolution, detail, and sharpness noise-free by setting the CLARITY AMPL control. This Clarity circuit is unique because it removes the industry wide "Dirty Window Effect" prevalent in all displayed video signals. The Clarity/Resolution Shaper output is summed with the Output video signal. The Clarity/Resolution Shaper has adjustable Noise Reduction via the NOISE REDUCE control.

The present invention provides adjustments for Luminance and Chrominance optimization via the CHROMA and LUMA adjust controls.

Black Level, Luminance, and Chrominance adjustments can be returned to original with the VIDEO MODE switch.

The output video signal can be split vertically to allow side-by-side on-screen comparison of the original to improved video signals. The WIPE MODE switch selects Normal/Wipe mode.

The circuitry of the present invention makes extensive use of wide bandwidth, low noise, and current feedback operational amplifiers in closed-loop configuration for stable and reproducible characteristics. Amplifiers have wide bandwidth and high slew rate resulting in minimum distortion to large amplitude high-speed video transitions. Filters have minimum overshoot and ringing to assure highest video fidelity after separating or recombining Luminance and Chroma components.

Horizontal and Vertical Blanking periods are regenerated and combined in the CPLD to generate Mixed Blanking which gates off the Luminance, Chrominance, and Clarity signals minimizing spurious output that could interfere in the Sync signal.

The Sync Separator operates with stability over a broad range of video level input, and outputs the necessary horizontal and vertical timing references. These references provide necessary timing information to the CPLD that regenerates all vertical signals (VWIN, VBLANK, MXDBLNK, and MVGATE).

A Macrovision Processing circuit is included that can be programmed to remove or pass the copy prevention signals from the vertical blanking interval. Q1 suppresses the copy prevention signals from U1 sync separator input by clamping them to ground for the eight horizontal lines during the vertical interval period that Macrovision signals are present. U13 and U14 form the Macrovision Clamp Generator (MV CLAMP GEN). U13D output pulse includes horizontal blanking plus the horizontal back porch time. When MV MODE switch is OFF Q7 is gated ON during the vertical interval period deleting the Macrovision signal by shunting it to ground. When MV MODE is ON the Macrovision signal is allowed to remain on the output signal.

Video output from OUTPUT AMP U12 is band passed filtered into Chrominance and Luminance components providing Y/C (S VIDEO) outputs.

Clarity and image edge definition is improved by driving an improved edge transition portion of the video signal (such as a vertical line that separate a white object from a black object and thus places a white pixel immediately adjacent a black pixel) as rapidly as can be accommodated by the video device within which the present invention is incorporated or with which the present invention is used. That is, the portion of the video signal representing the edge transition is formed so as to have as steep of a slope and can be accommodated by the video equipment. In order to mitigate undesirable effects or artifacts of such extreme driving of the video signal, such heavily sloped portions thereof are preferably clamped at the desired level (generally the maximum level of the video signal).

Figure 3:
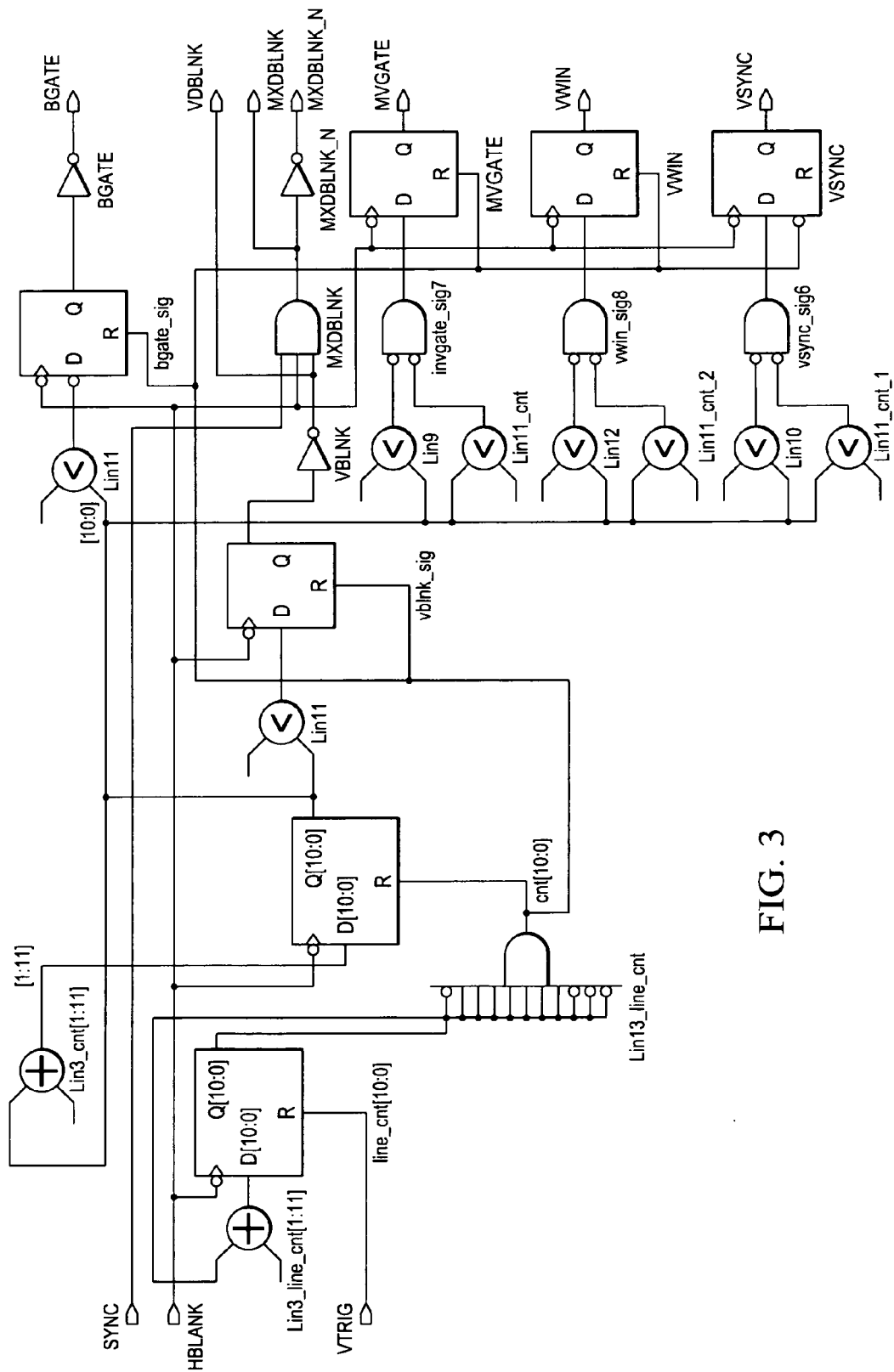
FIG. 3 is a logic diagram of the complex programmable logic device (CPLD) of FIG. 2.

Referring now to FIG. 3, the logic for the CPLD is provided. It is worthwhile to note that the CPLD may be replace with discrete components, a CPU driven logical circuit, or an ASIC, as desired.

Figure 4:
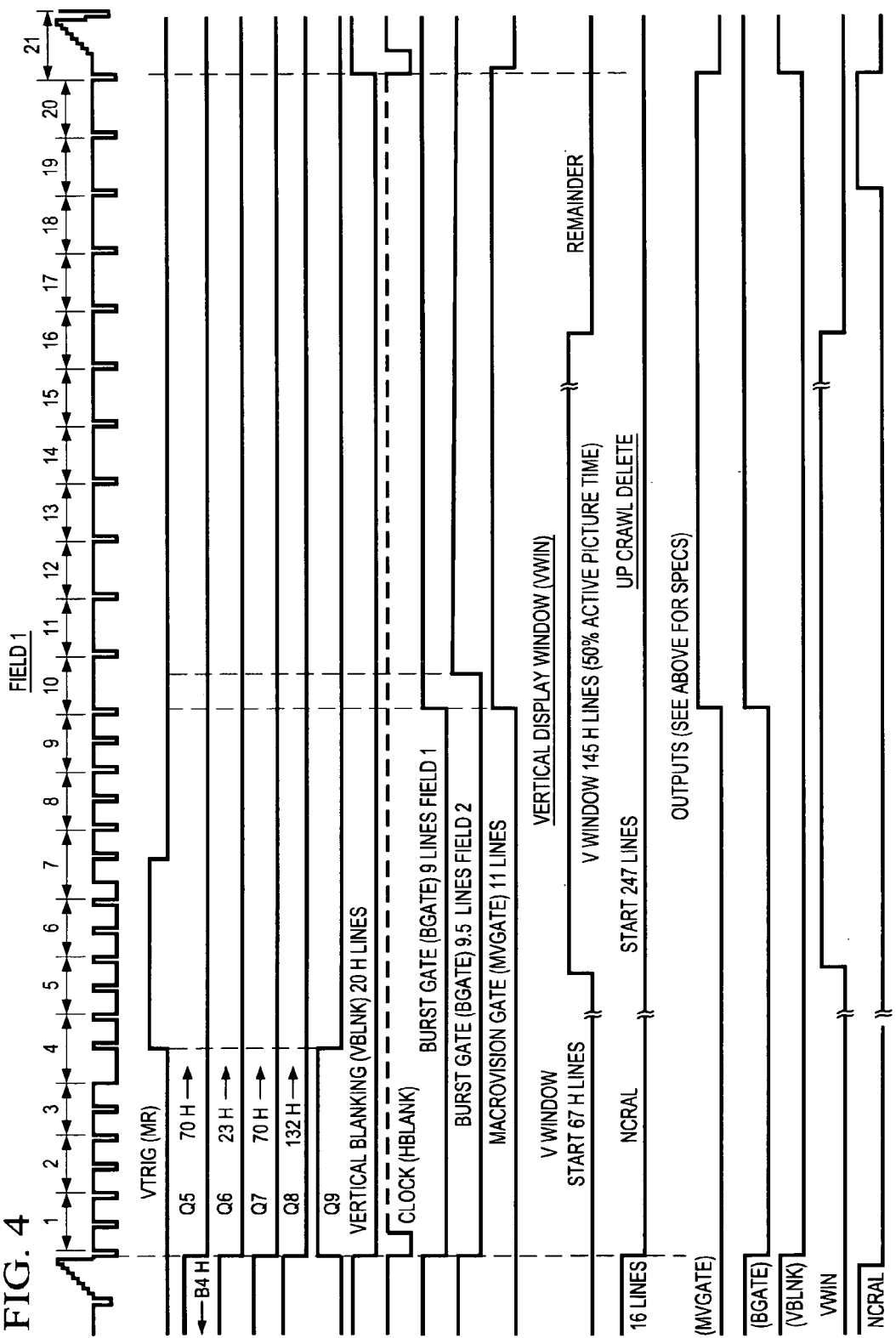
FIG. 4 is a timing diagram for the complex programmable logic device (CPLD) of FIG. 2.

Referring now to FIG. 4, an exemplary timing diagram for the CPLD is provided. As those skilled in the art will appreciate, other timing diagrams for the CPLD are likewise suitable and unique to this module module/circuit's needs.

Figure 5:
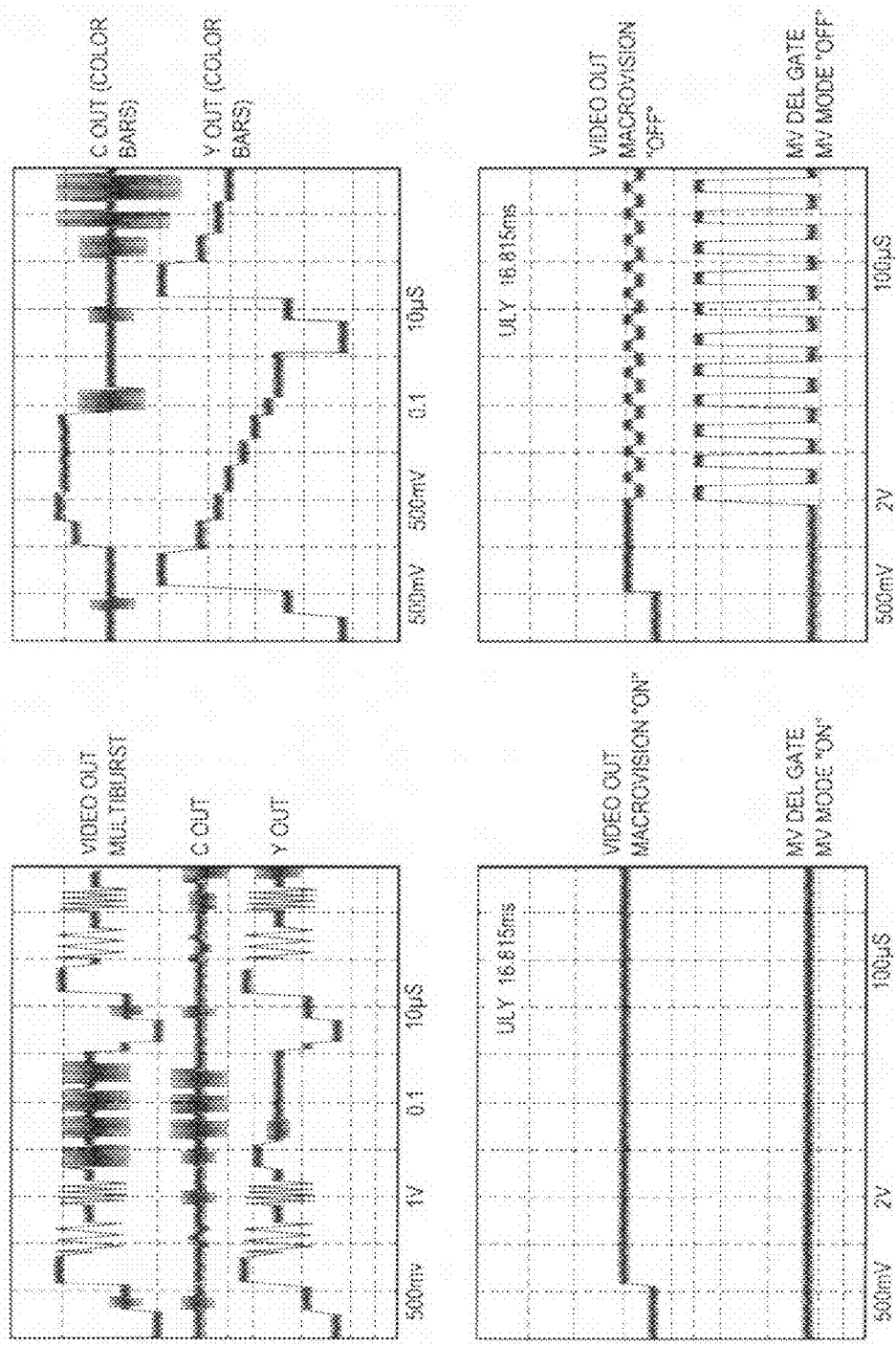
FIG. 5 shows some waveforms for the block diagram of FIG. 1 and the circuit schematic of FIG. 2.
Figure 6:
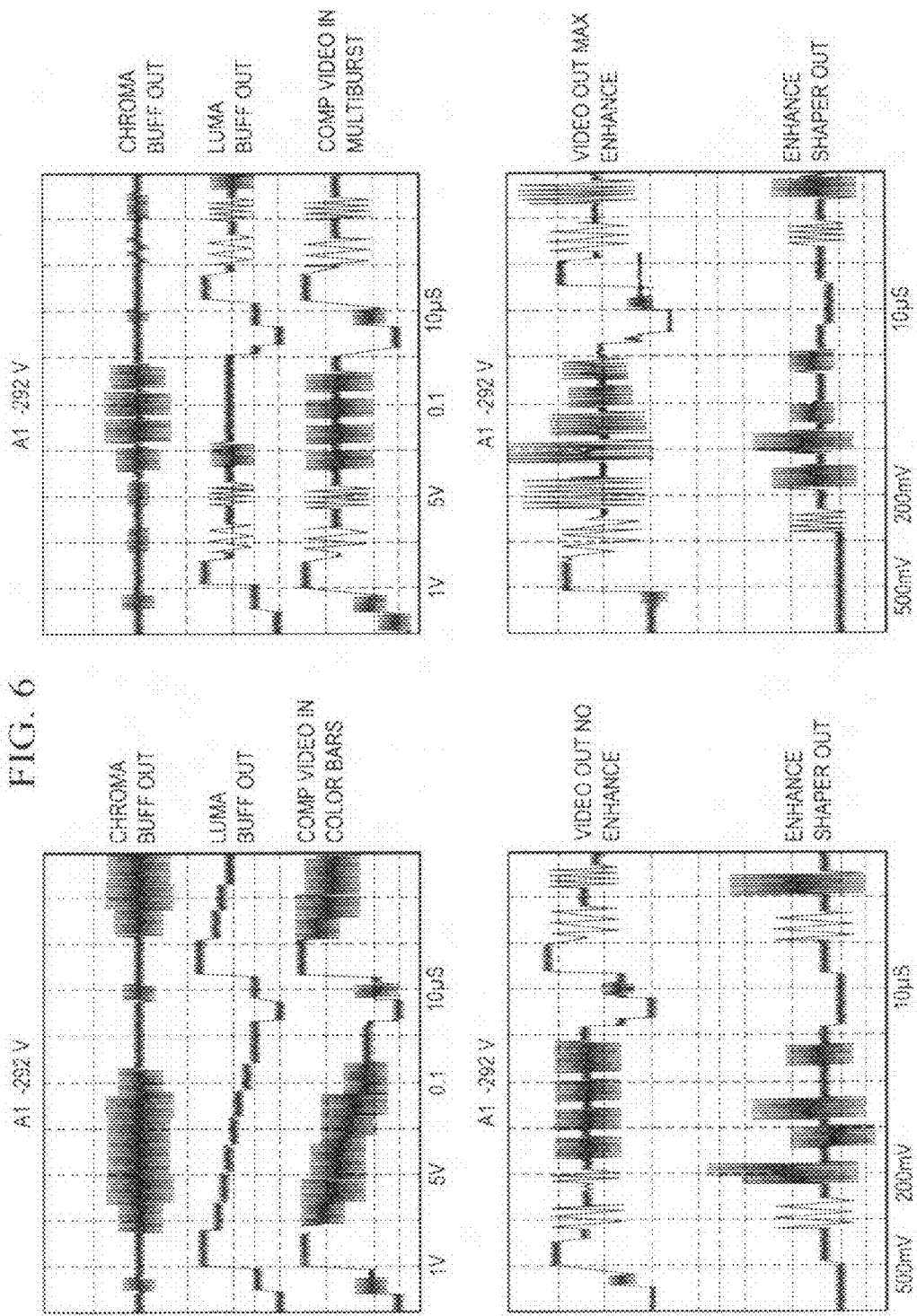
FIG. 6 shows some additional waveforms for the block diagram of FIG. 1 and the circuit schematic of FIG. 2.

Referring now to FIGS. 5 and 6, waveforms from portions of the circuit shown in FIG. 2 are provided. These waveforms show exemplary aspects of the circuit of the present invention.

Figure 7:
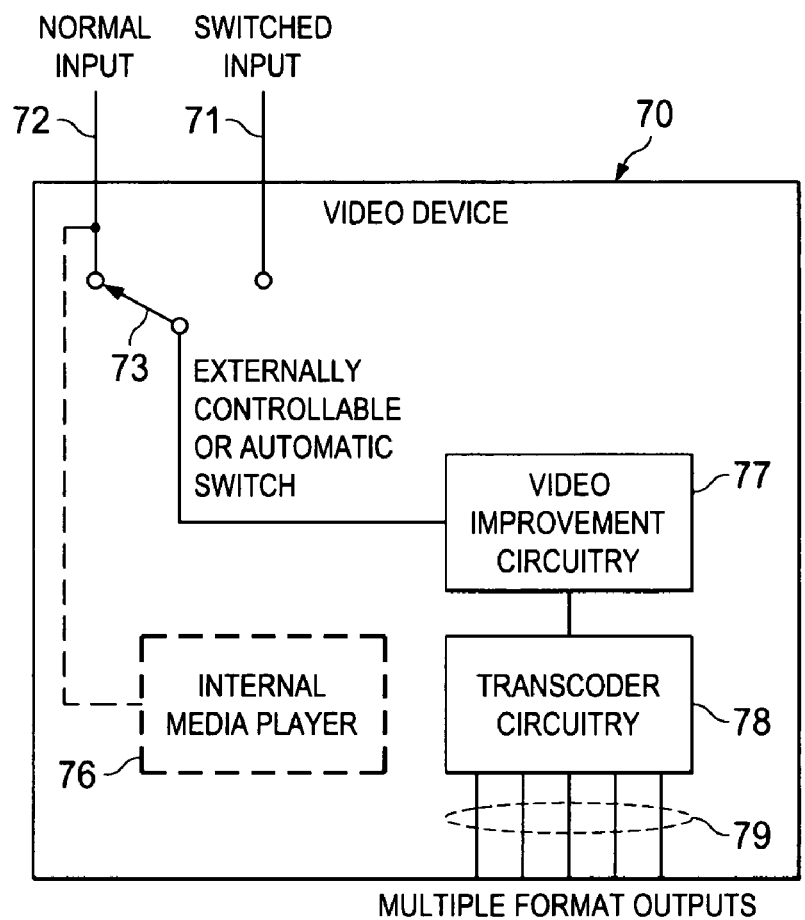
FIG. 7 is a block diagram of an exemplary switched input video device of the present invention.

Referring now to FIG. 7, the present invention further comprises a video device 70 having a switched input 71, such that either a normal input 72 may be provided to the video device 70 or the different, switched input 71 may be provided thereto.

The video device 70 may comprise, for example, a VCR, a video tape player, a DVD player, or a set top box. Those skilled in the art will appreciate that the video device may comprise various other items. One significant point is that the video device will generally comprises a contemporary device which is used to process video and which has built thereinto video improvement circuitry 77 and/or transcoder circuitry.

The normal input 72 is the input that a contemporary video device 70 would typically have. For example, if the video device is a set top box, then the normal input 72 will typically be a cable input.

In many instances, there will be no normal input. For example, many DVD players and other video devices do not have any external inputs. In this instance, the switch 73 may switch between the switched input 71 and an internal media player 76, such as a DVD reader.

Either the switched input 71 or the normal input 72 is selected by a switch 73. The switch 73 may be either a manually operated switch, which is preferably configured such that it can easily be operated from outside of the video device, or an automatic switch that senses the presence of a signal and then switched to the input having the signal. The switch 73 may optionally be remotely controllable.

The switch 73 may be actuated by plugging a switched input cable plug into a switched input jack. For example, the switch 73 may be actuated by plugging the cable from a VCR into a DVD player which has a switched input jack according to the present invention. This may be accomplished, for example, by using a switching phono jack, such as those commonly used to disconnect stereo speakers when a headset is plugged in.

Selecting the switched input 71 with the switch 73 permits an external device (or source of video), such as a DVD player, VCR, set top box, camera, cable (such as from a cable television provider) to utilize the video improvement circuitry 77 described herein and/or the transcoder 78. Use of the video improvement circuitry 77 will provide a better video picture for the input and thus allow a device which lacks such video improvement circuitry to be used in a manner that improves viewing quality. Use of the transcoder 78 of the video device 70 allows a used to obtain a video format which may be preferred or may be required by another device. The transcoder circuitry 78 provides a plurality of video formats via a corresponding plurality of outputs 79.

Benefits of the switched input of the present invention include savings in shelf space (fewer devices are needed, since the present invention can perform video improvement functions and/or transcoding, in addition to its normal functionality—such as playing a DVD), and costs savings (for the same reason). It should be appreciated that the switched input aspect of the present invention provides video improvement and transcoding at incremental shelf space and money costs, since these circuits use the same power supply, chassis, cabinet and other components as the basic video device, e.g., the DVD player. Thus, in many instances the switched input video device of the present invention will eliminate the need to purchase and allocated shelf space for a separate format converter or transcoder.

Examples of outputs of the transcoder circuit include, but are not limited to, NTSC, PAL, SECAM, MPEG, YC, digital video, HDTV, compressed and non-compressed video (including compressed RGB and non-compressed RGB), interlaced and non-interlaces video, y pb pr, r y b, y y, xc, cb and VGA.

The present invention comprises video circuits module/system on substrate or die that combines unique sub circuit inventions to improve dramatically all composite or component video in terms of its clarity and resolution and detail and contrast and black color qualities content also including electronically additive light results and comparison on screen original to improved video.

The added light result of our gain can produce a bandwidth, storage, data and volume reduction.

The present invention has variable control or fixed control. If variable controls are used, not only can they be adjusted to meet personal preference or exactness, they can correct for gross error or upstream problems, tolerances, deficiencies from wrong color saturation, color balance, added light, poor resolution, grays instead of blacks, etc.

In view of the foregoing, the quality of contemporary video devices resulting from improvements in circuit bandwidth and dynamic range, as well as improved component tolerances, facilitates the use of non-standard waveforms according to the present invention. These non-standard waveforms provide improvements to the aesthetic appeal of a video image displayed using the video devices. According to the present invention, the improved quality of a contemporary video device facilitates the use of waveforms having quicker rise and fall times (corresponding to higher frequency components thereof and having greater amplitude or other non-standard signal levels, as compared to the appropriate standard.

According to the present invention, contemporary video devices take better advantage of the quality of the components and circuits thereof to provide a substantially improved and consequently more aesthetically appealing picture.

Macrovision uses % of the bandwidth in its process which lowers the contrast and causes pluses which interfere with improvement. This circuit allows macrovision signals to come in then get processed because of gating by the CPLD then be re-added after improvement of our invention. If we did not remove it during our improvement, the improvement would not work or be as effective.

As discussed above, improved picture quality is achieved by providing a method and apparatus for improving clarity, resolution, contrast, light, black video which, among other things, takes advantage of a new clarity quality of contemporary video devices so as to permit the use of video signal waveforms which do not necessarily comply strictly with the appropriate standard.

Further, according to the present invention a method and apparatus for improving video which, among other things, optimizes the operation of a video device within the constraints of a finite bandwidth and dynamic range is provided.

The system of the present invention can be formed upon a single module or die which performs all of the video improvement functions described herein. The combination of all of the different aspects of video improvement described herein provides a substantial improvement in the perceived aesthetics of a displayed video image.

Use of the present invention generally provides blacker blacks, whiter whites, more vivid colors, improved detail, improved contrast and better lighting in otherwise dark portion of an image. The present invention may be used in recording video, playing back video, broadcasting video, and repairing degraded video or bad video.

It is understood that the exemplary method and apparatus for clarifying video described herein and shown in the drawings represents only a presently preferred and working embodiment of the invention. Indeed, various modifications and additions may be made to such embodiment without departing from the spirit and scope of the invention. For example, the circuit may alternative be specifically configured so as to process video signals which are compliant with standards other than NTSC, to include all forms of digital and component video.

Thus, these and other modifications and additions may be obvious to those skilled in the art and may be implemented to adapt the present invention for use in a variety of different applications.

I claim:

1. A switched input video device comprising:
   a switched input
   a video improvement circuit; and
   a switch for communicating the switched input to the video improvement circuit, wherein the switch is operable to sense a presence of a signal on the switched input and communicate the switched input to the video improvement circuit in response to the sensed signal,
   wherein the video improvement circuit is configured to:
      receive a video signal that complies with a standard;
      sense one or more blanking portions of the video signal; and
      alter the video signal during a portion of the video signal other than the one or more blanking portions, wherein the altered portion of the video signal does not comply with the standard and the alterations improve a characteristic of the video signal.

2. The switched input video device as recited in claim 1, further comprising an internal media player and wherein the switch selects either the Internal medial player or the switched Input.

3. The switched input video device as recited in claim 1, wherein the switch is externally controlled.

4. The switched input video device as recited in claim 1, wherein the switch is remotely controlled.

* * * * *